(12) United States Patent
Dixon et al.

(10) Patent No.: US 9,325,498 B2
(45) Date of Patent: *Apr. 26, 2016

(54) PERFORMING AES ENCRYPTION OR DECRYPTION IN MULTIPLE MODES WITH A SINGLE INSTRUCTION

(71) Applicant: Intel Corporation, Santa Clara, CA (US)

(72) Inventors: Martin Dixon, Portland, OR (US); Srinivas Chennupaty, Portland, OR (US); Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/790,748

(22) Filed: Mar. 8, 2013

(65) Prior Publication Data

US 2013/0202106 A1     Aug. 8, 2013

Related U.S. Application Data

(63) Continuation of application No. 11/724,005, filed on Mar. 14, 2007, now Pat. No. 8,538,012.

(51) Int. Cl.
*G06F 21/00* (2013.01)
*H04L 9/28* (2006.01)
*H04L 9/06* (2006.01)

(52) U.S. Cl.
CPC .............. *H04L 9/28* (2013.01); *H04L 9/0631* (2013.01); *H04L 2209/12* (2013.01)

(58) Field of Classification Search
CPC ....... H04L 9/0631; H04L 9/06; H04L 9/0625; H04L 9/0681; H04L 2209/12; H04L 2209/122
USPC ............................................................ 380/28
See application file for complete search history.

(56) References Cited

U.S. PATENT DOCUMENTS 6,078,663 A * 6/2000 Yamamoto ................... 380/260
6,118,870 A   9/2000 Boyle et al.
(Continued)

FOREIGN PATENT DOCUMENTS

CN     1677921 A     10/2005
EP     1496421 A2    1/2005
(Continued)

OTHER PUBLICATIONS

Tillich, S. et al, 'An Instruction Set Extension for Fast and Memory-Efficient AES Implementation', International Federation for Information Processing 2005, CMS 2005, LNCS 3677, pp. 11-21, 2005, http://citeseerx.ist.psu.edu/viewdoc/download?doi=10.1.1.83.55&rep=rep1&type=pdf.*

(Continued)

*Primary Examiner* — Christopher Brown
*Assistant Examiner* — Ronald Baum
(74) *Attorney, Agent, or Firm* — Trop, Pruner & Hu, P.C.

(57) ABSTRACT

A machine-readable medium may have stored thereon an instruction, which when executed by a machine causes the machine to perform a method. The method may include combining a first operand of the instruction and a second operand of the instruction to produce a result. The result may be encrypted using a key in accordance with an Advanced Encryption Standard (AES) algorithm to produce an encrypted result. The method may also include placing the encrypted result in a location of the first operand of the instruction.

21 Claims, 6 Drawing Sheets

(56) References Cited

U.S. PATENT DOCUMENTS

| | | | |
|---|---|---|---|
| 6,324,288 B1 | 11/2001 | Hoffman | |
| 6,704,871 B1 | 3/2004 | Kaplan et al. | |
| 6,937,727 B2 | 8/2005 | Yup et al. | |
| 7,392,399 B2* | 6/2008 | Grohoski | G06F 9/3879 712/E9.067 |
| 7,496,196 B2 | 2/2009 | Jalfon et al. | |
| 7,509,501 B2 | 3/2009 | Park et al. | |
| 7,532,726 B2 | 5/2009 | Fukuoka et al. | |
| 7,606,363 B1* | 10/2009 | MacDonald et al. | 380/29 |
| 7,783,037 B1* | 8/2010 | Bong | 380/37 |
| 8,094,811 B2* | 1/2012 | Yokota et al. | 380/28 |
| 2001/0033656 A1* | 10/2001 | Gligor et al. | 380/28 |
| 2002/0191784 A1* | 12/2002 | Yup et al. | 380/37 |
| 2003/0002664 A1* | 1/2003 | Anand | 380/37 |
| 2003/0091036 A1* | 5/2003 | Milliken et al. | 370/354 |
| 2003/0108195 A1* | 6/2003 | Okada et al. | 380/37 |
| 2003/0108196 A1* | 6/2003 | Kirichenko | 380/37 |
| 2003/0133568 A1* | 7/2003 | Stein et al. | 380/37 |
| 2003/0223580 A1* | 12/2003 | Snell | 380/28 |
| 2003/0223581 A1* | 12/2003 | Hanounik | 380/37 |
| 2004/0017913 A1* | 1/2004 | Hawkes et al. | 380/37 |
| 2004/0148512 A1 | 7/2004 | Park et al. | |
| 2004/0184602 A1 | 9/2004 | Nadehara | |
| 2004/0202317 A1 | 10/2004 | Demjanenko et al. | |
| 2004/0202319 A1* | 10/2004 | Hussain et al. | 380/33 |
| 2004/0223610 A1 | 11/2004 | Henry et al. | |
| 2005/0036618 A1* | 2/2005 | Gammel et al. | 380/255 |
| 2005/0147239 A1 | 7/2005 | Chin et al. | |
| 2005/0232415 A1* | 10/2005 | Little et al. | 380/28 |
| 2005/0286720 A1 | 12/2005 | Fukuoka et al. | |
| 2006/0015748 A1* | 1/2006 | Goto et al. | 713/190 |
| 2006/0147040 A1 | 7/2006 | Lee et al. | |
| 2007/0177627 A1* | 8/2007 | Raju | H04J 3/1605 370/469 |
| 2007/0286415 A1* | 12/2007 | Bertoni et al. | 380/37 |
| 2008/0025509 A1* | 1/2008 | Van De Ven | H04L 9/0637 380/210 |
| 2008/0069339 A1 | 3/2008 | Parveen et al. | |

FOREIGN PATENT DOCUMENTS

| | | |
|---|---|---|
| EP | 1519509 A2 | 3/2005 |
| EP | 1596530 A1 | 11/2005 |
| GB | 0804870.4 | 4/2008 |
| JP | 07-261662 | 10/1995 |
| JP | 7-261662 | 10/1995 |
| JP | 2004-233427 | 8/2004 |

OTHER PUBLICATIONS

Dworkin, M., 'NIST Special Publication 800-38A, 2001 edition, Recommendation for Block Cipher Modes of Operation Methods and Techniques', Dec. 2001, entire document, http://csrc.nist.gov/publications/nistpubs/800-38a/sp800-38a.pdf.*

Good, T., et al, 'AES on FPGA from the Fastest to the Smallest', Springer-Verlag Berlin Heidelberg, CHES 2005, LNCS 3659, pp. 427-440, http://class.ece.iastate.edu/tyagi/cpre681/papers/AESCHES05.pdf.*

Hamburg, M., 'Accelerating AES with Vector Permute Instructions', In CHES, vol. 5747 of Lecture Notes in Computer Science, pp. 18-32. Springer, 2009, https://shiftleft.org/papers/vector_aes/vector_aes.pdf.*

Korean Intellectual Property Office, Notice of Preliminary Rejection mailed Aug. 28, 2013 in Korean application No. 10-2013-56494, and 5 pages of translation.

Chinese Patent Office, Office Action mailed Dec. 9, 2011 in Chinese application No. 200810096342.2.

State Intellectual Property Office of the People's Republic of China, Office Action mailed Jun. 5, 2012 in Chinese application No. 200810096342.2.

Korean International Patent Office, Office Action mailed Sep. 24, 2012 in Korean application No. 10-2010-59386.

Japanese Patent Office, Office Action mailed Jan. 25, 2011 in Japanese patent application No. 2008-0064272.

Office Action Received for Chinese Patent Application No. 200810096342.2 , mailed on Apr. 1, 2010, 4 Pages of Chinese Office Action, and 4 Pages of English Translation.

Korean Patent Application 10-2008-24067, office action dated Feb. 18, 2010, 6 pages.

Combined Search and Examination Report received for United Kingdom Patent Application No. GB0804870.4, mailed on Jun. 25, 2008, 7 pages.

Astarloa, A. et al., "Multi-architectural 128 bit AES-CBC Core based on Open-Source Hardware AES Implementations for secure industrial communications", International Conference on Communication Technology, Nov. 27-30, 2006, 6 pages.

Office action dated May 15, 2009 from German application No. 10 2008 014 359.6-31, 6 pages.

"2004 IEEE Workshop on Signal processing Systems design and Implementation", published 2004, IEEE, pp. 152-157 Nadehara et al. "Extended Instructions for the AES cryptography and their efficient implementattion". See whole document.

VIA Technologies, VIA PadLock Programming Guide, May 3, 2005, pp. 1-55.

* cited by examiner

ECB Mode Encryption Using New Instruction 410

```
        MOV XMM0, Key      # Load the key from memory or another register
        MOV ECX, 16        # Number of 128-bit blocks to encrypt
Loop:
        MOV XMM1, 0        # Clear out the register for ECB mode.
        AESENCRYPT XMM1, PlainMemory[ECX]  # Do the EBC encryption
        MOV CipherMemory[ECX], XMM1 # Store the ciphertext
        DEC ECX # Decrement the loop counter
        JNE Loop # Jump back to the Loop
```

CBC Mode Encryption Using New Instruction — 710

```
         MOV XMM0, Key       # Load the key from memory or another register
         MOV ECX, 16         # Number of 128-bit blocks to encrypt
         MOV XMM1, 0         # Clear the Ciphertext prior to calling encrypt
  Loop:
         AESENCRYPT XMM1, PlainMemory[ECX]   # Do the CBC encryption
         MOV CipherMemory[ECX], XMM1 # Store the ciphertext
310      DEC ECX # Decrement the loop counter
         JNE Loop # Jump back to the Loop
```

CTR Mode Encryption Using New Instruction — 910

```
        MOV XMM0, Key        # Load the key from memory or another register
        MOV ECX, 16          # Number of 128-bit blocks to encrypt
        MOV XMM4, Counter    # The counter
Loop:
        MOV XMM3, PlainMemory[ECX]    # Load the Plaintext into a register
        AESENCRYPT XMM3, XMM4         # Do the CTR encryption
        MOV CipherMemory[ECX], XMM3   # Store the ciphertext
        ADD XMM4, Count               # Increment the counter by Count
        DEC ECX                       # Decrement the loop counter
        JNE Loop                      # Jump back to the Loop
```

PERFORMING AES ENCRYPTION OR DECRYPTION IN MULTIPLE MODES WITH A SINGLE INSTRUCTION

This application is a continuation of U.S. patent application Ser. No. 11/724,005, filed Mar. 14, 2007, the content of which is hereby incorporated by reference.

BACKGROUND

Implementations of the claimed invention generally may relate to processors, and in particular to instructions for causing processors to perform Advanced Encryption Standard (AES) encryption or decryption.

AES is the advanced encryption standard from the National Institute of Standards and Technology (NIST), and is defined in FIPS Publication 197. AES may have a variable key size. There are 3 acceptable key sizes: 128-bit, 192-bit and 256-bit. AES encryption takes 128-bits plaintext input and a key, and then produces 128-bits of ciphertext (e.g., plaintext that has been AES encrypted) output. Similarly, AES decryption performs an opposite operation where it takes 128-bits ciphertext and a key to produce 128-bits of plaintext.

AES may be used in many modes of operation. One of the more common modes is the so-called Cipher-Block Chaining (CBC) mode. A somewhat less common mode is the so-called Electronic Codebook (ECB) mode. Other modes are also possible, such as the emergent so-called Counter mode (CTR), which is conceptually similar to ECB.

In computing systems, it may be desirable to have an instruction or instructions for a processor that is dedicated to AES encryption and/or decryption.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Overview

This application describes embodiments of methods, apparatuses and systems for including in a processor instructions for performing AES encryption and/or decryption. Two such instructions are:

AESENCRYPT (arg1)xmmdestination, (arg2)xmmsource/memory

AESDECRYPT (arg1)xmmdestination, (arg2)xmmsource/memory

The xmmsource/memory supplies the plaintext to be used in the encryption case, and the xmmdestination will be the ciphertext. In the decryption case the roles are reversed, and the source is ciphertext with the destination being plaintext. In some implementations, both operands may be used to encrypt or decrypt, as will be explained further below. In both cases the encryption key is supplied to the AESENCRYPT and/or AESDECRYPT instruction through the use of one or more 128-bit implicit registers (e.g., XMM0 & XMM1 as will be described in greater detail below).

Although much of the following description will focus on the encryption instruction, AESENCRYPT, those skilled in the encryption arts will understand that the decryption instruction, AESDECRYPT, may also be substituted and/or used in a similar way for decryption. Describing primarily AESENCRYPT is done purely for clarity and ease of description, and does not indicate that one of the instructions is any more important than the other.

Computer System

Figure 1:
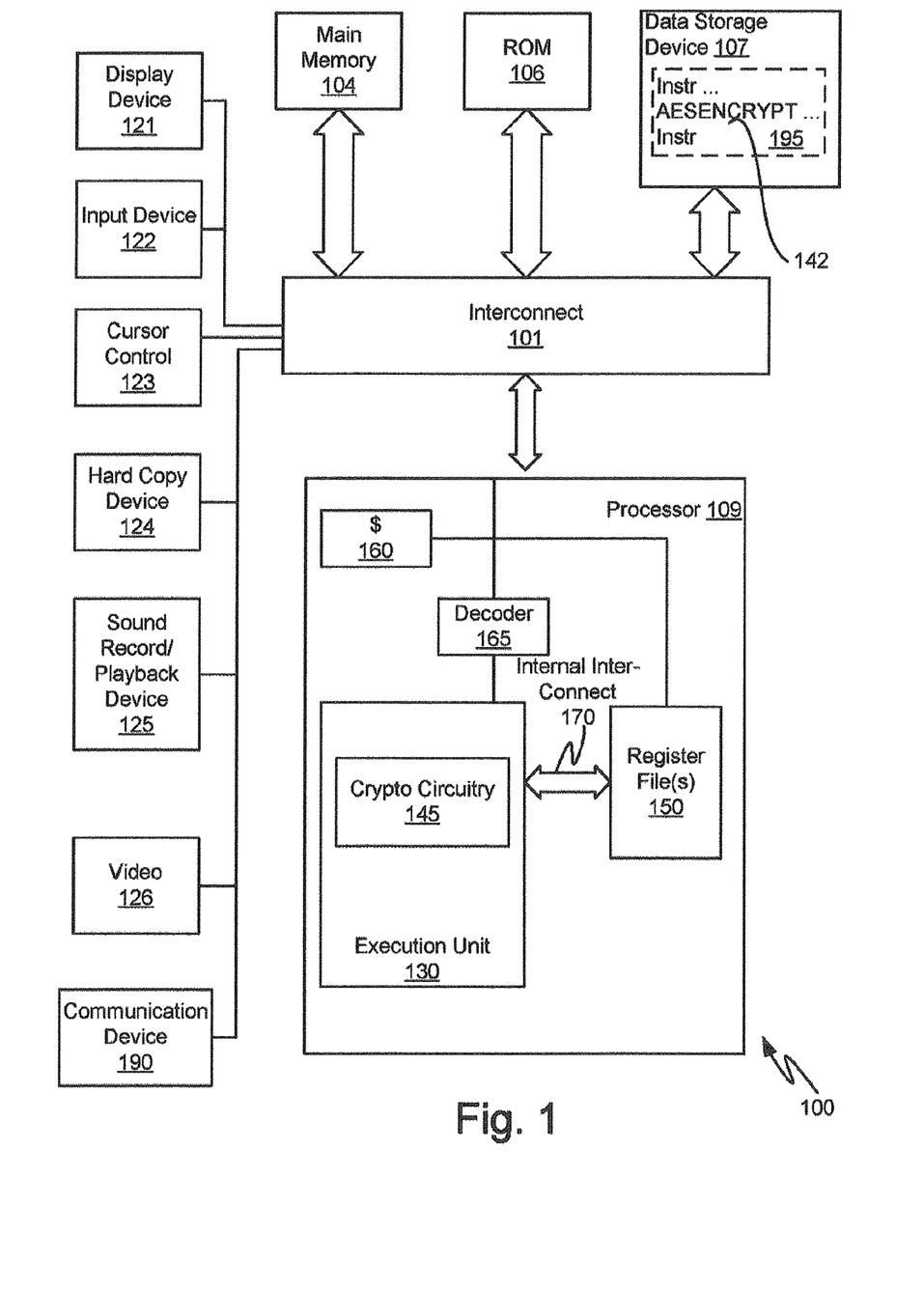
FIG. 1 illustrates an example computer system according to some implementations.

FIG. 1 illustrates an example computer system 100 according to one embodiment of the invention. Computer system 100 includes an interconnect 101 for communicating information. The interconnect 101 may include a multi-drop bus, one or more point-to-point interconnects, or any combination of the two, as well as any other communications hardware and/or software.

FIG. 1 illustrates a processor 109, for processing information, coupled with interconnect 101. Processor 109 represents a central processing unit of any type of architecture, including a CISC or RISC type architecture.

Computer system 100 further includes a random access memory (RAM) or other dynamic storage device (referred to as main memory 104), coupled to interconnect 101 for storing information and instructions to be executed by processor 109. Main memory 104 also may be used for storing temporary variables or other intermediate information during execution of instructions by processor 109.

Computer system 100 also includes a read only memory (ROM) 106, and/or other static storage device, coupled to interconnect 101 for storing static information and instructions for processor 109. Data storage device 107 is coupled to interconnect 101 for storing information and instructions.

FIG. 1 also illustrates that processor 109 includes an execution unit 130, a register file 150, a cache 160, a decoder 165, and an internal interconnect 170. Of course, processor 109 contains additional circuitry that is not necessary to understanding the invention.

Decoder 165 is for decoding instructions received by processor 109 and execution unit 130 is for executing instructions received by processor 109. In addition to recognizing instructions typically implemented in general purpose processors, decoder 165 and execution unit 130 recognize instructions, as described herein, for performing AES encryption or decryption (AESENCRYPT or AESDECRYPT) operations. The decoder 165 and execution unit 130 recognize instructions for performing AESENCRYPT or AESDECRYPT operations on both packed and unpacked data.

Execution unit 130 is coupled to register file 150 by internal interconnect 170. Again, the internal interconnect 170 need not necessarily be a multi-drop bus and may, in alternative embodiments, be a point-to-point interconnect or other type of communication pathway.

Register file(s) 150 represents a storage area of processor 109 for storing information, including data. It is understood that one aspect of the invention is the described instruction embodiments for performing AESENCRYPT or AESDECRYPT operations on packed or unpacked data. According to this aspect of the invention, the storage area used for storing the data is not critical. However, embodiments of the register file 150 are later described with reference to FIG. 2.

Execution unit 130 is coupled to cache 160 and decoder 165. Cache 160 is used to cache data and/or control signals from, for example, main memory 104. Decoder 165 is used for decoding instructions received by processor 109 into control signals and/or microcode entry points. These control signals and/or microcode entry points may be forwarded from the decoder 165 to the execution unit 130.

In response to these control signals and/or microcode entry points, execution unit 130 performs the appropriate operations. For example, if an AESENCRYPT or AESDECRYPT instruction is received, decoder 165 causes execution unit 130 to perform the required bit encryption or decryption. For at least some embodiments, the execution unit 130 may encrypt or decrypt 128 bits of plaintext or ciphertext using one or more keys (see, e.g., crypto circuitry 145).

Decoder 165 may be implemented using any number of different mechanisms (e.g., a look-up table, a hardware implementation, a PLA, etc.). Thus, while the execution of the various instructions by the decoder 165 and execution unit 130 may be represented herein by a series of if/then statements, it is understood that the execution of an instruction does not require a serial processing of these if/then statements. Rather, any mechanism for logically performing this if/then processing is considered to be within the scope of the invention.

FIG. 1 additionally shows a data storage device 107 (e.g., a magnetic disk, optical disk, and/or other machine readable media) can be coupled to computer system 100. In addition, the data storage device 107 is shown to include code 195 for execution by the processor 109. The code 195 can include one or more embodiments of an AESENCRYPT or AESDECRYPT instruction 142, and can be written to cause the processor 109 to perform bit AES encryption or decryption with the AESENCRYPT or AESDECRYPT instruction(s) 142 for any number of security-related purposes.

Computer system 100 can also be coupled via interconnect 101 to a display device 121 for displaying information to a computer user. Display device 121 can include a frame buffer, specialized graphics rendering devices, a liquid crystal display (LCD), and/or a flat panel display.

An input device 122, including alphanumeric and other keys, may be coupled to interconnect 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device that may be coupled to interconnect 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device 125 may include a speaker which is coupled to a digital to analog (D/A) converter for playing back the digitized sounds.

Computer system 100 can be a terminal in a computer network (e.g., a LAN). Computer system 100 would then be a computer subsystem of a computer network. Computer system 100 optionally includes video digitizing device 126 and/or a communications device 190 (e.g., a serial communications chip, a wireless interface, an Ethernet chip or a modem, which provides communications with an external device or network). Video digitizing device 126 can be used to capture video images that can be transmitted to others on the computer network.

For at least one embodiment, the processor 109 supports an instruction set that is compatible with the instruction set used by existing processors (such as, e.g., the Intel® Pentium® Processor, Intel® Pentium® Pro processor, Intel® Pentium® II processor, Intel® Pentium® III processor, Intel® Pentium® 4 Processor, Intel® Itanium® processor, Intel® Itanium® 2 processor, or the Intel® Core™ Duo processor) manufactured by Intel Corporation of Santa Clara, Calif. As a result, processor 109 can support existing processor operations in addition to the operations of the invention. Processor 109 may also be suitable for manufacture in one or more process technologies and by being represented on a machine readable media in sufficient detail, may be suitable to facilitate said manufacture. While the invention is described below as being incorporated into an x86 based instruction set, alternative embodiments could incorporate the invention into other instruction sets. For example, the invention could be incorporated into a 64-bit processor using an instruction set other than the x86 based instruction set.

Figure 2:
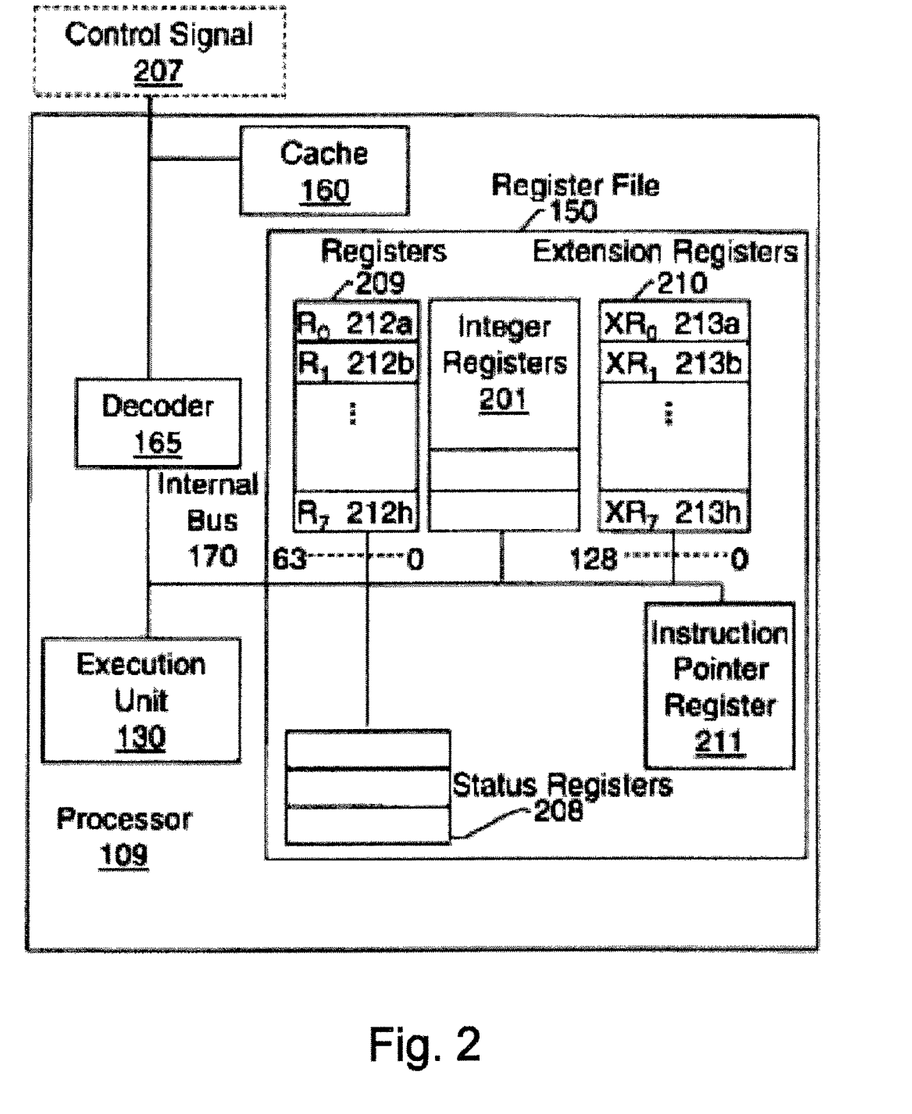
FIG. 2 illustrates register files of a processor according to some implementations.

FIG. 2 illustrates the register file of the processor according to one alternative embodiment of the invention. The register file 150 may be used for storing information, including control/status information, integer data, floating point data, and packed data. In the embodiment shown in FIG. 2, the register file 150 includes integer registers 201, registers 209, status registers 208, extension registers 210, and instruction pointer register 211. Status registers 208, instruction pointer register 211, integer registers 201, registers 209, are all coupled to internal interconnect 170. Additionally, extension registers 210 are also coupled to internal interconnect 170. The internal interconnect 170 may be, but need not necessarily be, a multi-drop bus. The internal interconnect 170 may instead may be any other type of communication pathway, including a point-to-point interconnect.

For at least one embodiment, the extension registers 210 are used for both packed integer data and packed floating point data. For alternative embodiments, the extension registers 210 may be used for scalar data, packed Boolean data, packed integer data and/or packed floating point data. Of course, alternative embodiments may be implemented to contain more or less sets of registers, more or less registers in each set or more or less data storage bits in each register without departing from the broader scope of the invention.

For at least one embodiment, the integer registers 201 are implemented to store thirty-two bits, the registers 209 are implemented to store eighty bits (all eighty bits are used for storing floating point data, while only sixty-four are used for packed data) and the extension registers 210 are implemented to store 128 bits. In addition, extension registers 210 may contain eight registers, XR0 213a through XR7 213h. XR0 213a, XR1 213b and XR2 213c are examples of individual registers in registers 210. For example, 128-bit extension registers 210 may be used to provide one or both operands for an AESENCYPT instruction, and may be used to provide one or both of the implicit registers (e.g., XMM0 & XMM1) used by the AESENCYPT instruction.

For another embodiment, the integer registers 201 each contain 64 bits, the extension registers 210 each contain 64 bits and extension registers 210 contains sixteen registers. For one embodiment two registers of extension registers 210 may be operated upon as a pair. For yet another alternative embodiment, extension registers 210 contains thirty-two registers.

AES Encryption and/or Decryption Operation(s)

Figure 3:
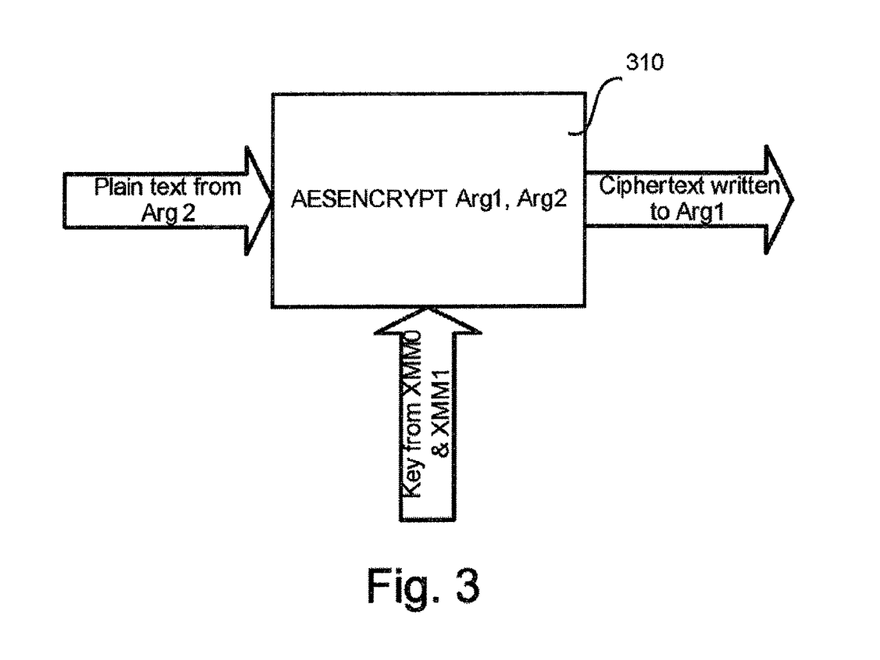
FIG. 3 conceptually illustrates an AES encryption instruction used in ECB mode.

FIG. 3 conceptually illustrates an AES encryption instruction (AESENCRYPT Arg1, Arg2) 310 used in ECB mode. As shown, AESENCRYPT 310 has two operands, one of which, Arg2, supplies the plaintext to be encrypted. The encrypted ciphertext is written to Arg1 of AESENCRYPT 310. The encryption key is supplied from one or more of the implicit 128-bit registers XMM0 and XMM1. If, for example, the encryption key is 128 bits in length, it may be supplied by one of the registers XMM0. In such a case, the other register XMM1 may be used in another capacity, as will be described with regard to FIG. 4.

As may be seen in FIG. 3, AESENCRYPT 310 is used in ECB mode by encrypting the plaintext from Arg2 with a key. One scheme to determine which mode (e.g., ECB, CBC, etc.) in which AESENCRYPT 310 operates is to use the operands to determine the mode. In one implementation, AESENCRYPT 310 exclusive ORs (XORs) its operands, Arg1 and Arg2 before encrypting the result with the key. Such scheme, which will be described in further detail with regard to FIG. 4, enables one or two inputs to AESENCRYPT 310. If only one input is desired, such as Arg2 for ECB mode as shown in FIG. 3, the other operand Arg1 may be set to zero so that the XOR operation by AESENCRYPT 310 yields just the first operand, Arg2, for encryption by the key. How this XORing scheme may be used for CBC and CTR mode will be further described with regard to FIGS. 5-9.

Another scheme (not shown) for determining in which mode AESENCRYPT 310 operates may be to employ an immediate byte in the AESENCRYPT 310 instruction in addition to the two operands Arg1 and Arg2. This second scheme, in contrast to the first where the operands are XORed, may specify how and/or whether to use one or both of the operands of AESENCRYPT 310 based on the content of the immediate byte. Other schemes than these two are both possible and contemplated to enable a single, two operand instruction, such as AESENCRYPT 310 (or AESDECRYPT) to be used in multiple different modes (e.g., ECB, CBC, CTR, etc.).

Figure 4:
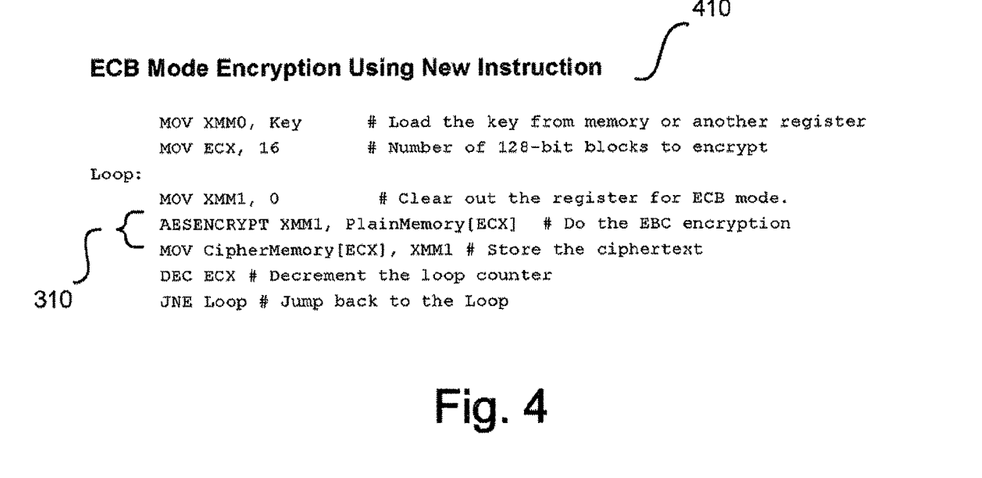
FIG. 4 illustrates example code for using the AES encryption instruction in ECB mode.

FIG. 4 illustrates example code (e.g., which when executed by processor 190 constitutes a method) 410 for using AESENCRYPT 310 in ECB mode. First the encryption key is loaded (via MOV instruction or similar) into one of the implicit registers XMM0. Next a value (e.g., 16) may be loaded (via MOV instruction or similar) into another register ECX to set the number of 128-bit blocks of plaintext to AES encrypt. This value multiplied by 128 bits may specify the total length of the plaintext to be encrypted by code 410. After such initialization, a loop including AESENCRYPT 310 may be executed ECX times.

Within the loop, the second implicit register XMM1 is cleared for ECB mode by loading a value of zero. As explained above, this value of zero when XORed by AESENCRYPT 310 with the second operand, produces the second operand which is the desired result to operate in ECB mode. Turning to the next instruction, AESENCRYPT 310 takes the plaintext in Plainmemory[ECX], encrypts the plaintext with the key in XMM0, and writes the result into the second implicit register XMM1. Next the ciphertext in XMM1 is stored to Ciphermemory[ECX] and the loop value in ECX is decremented before jumping back to the beginning of the loop.

At the next loop, XMM1 is again cleared of the encrypted result for the previous 128 bits. In this way, AESENCRYPT 310 has the single input of Plainmemory[ECX] for the decremented value in ECX to be encrypted by the key in XMM0. The looping execution of code 410 may continue until all blocks of plaintext specified by the initial value loaded into ECX have been AES encrypted in ECB mode.

Figure 5:
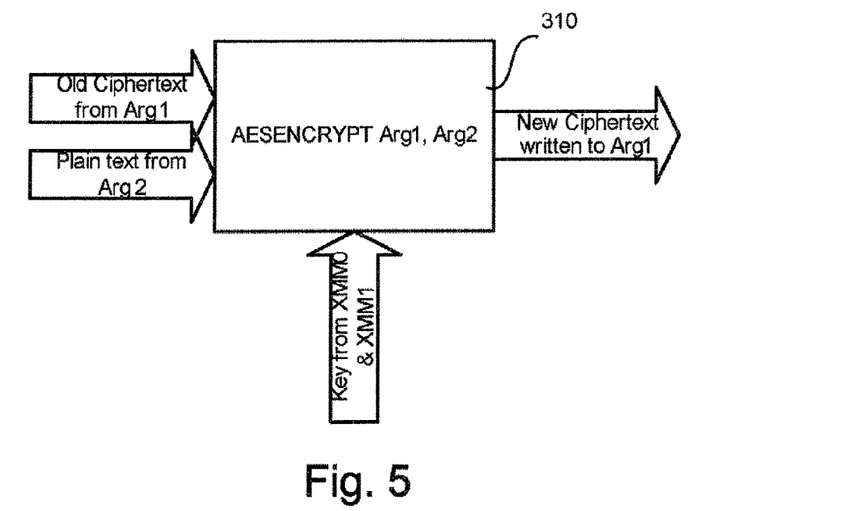
FIG. 5 conceptually illustrates an AES encryption instruction used in CBC mode.

FIG. 5 conceptually illustrates an AES encryption instruction (AESENCRYPT Arg1, Arg2) 310 used in CBC mode. As shown, AESENCRYPT 310 has two operands, one of which, Arg2, supplies the plaintext to be encrypted. In CBC mode, the other operand, Arg1, provides so-called "old" ciphertext from the prior encrypted block, which is XORed with the plaintext by AESENCRYPT 310 before encryption. The encryption key is supplied from one or more of the implicit 128-bit registers XMM0 and XMM1. The encrypted ciphertext for the current block is overwritten on Arg1 of AESENCRYPT 310.

Figure 6:
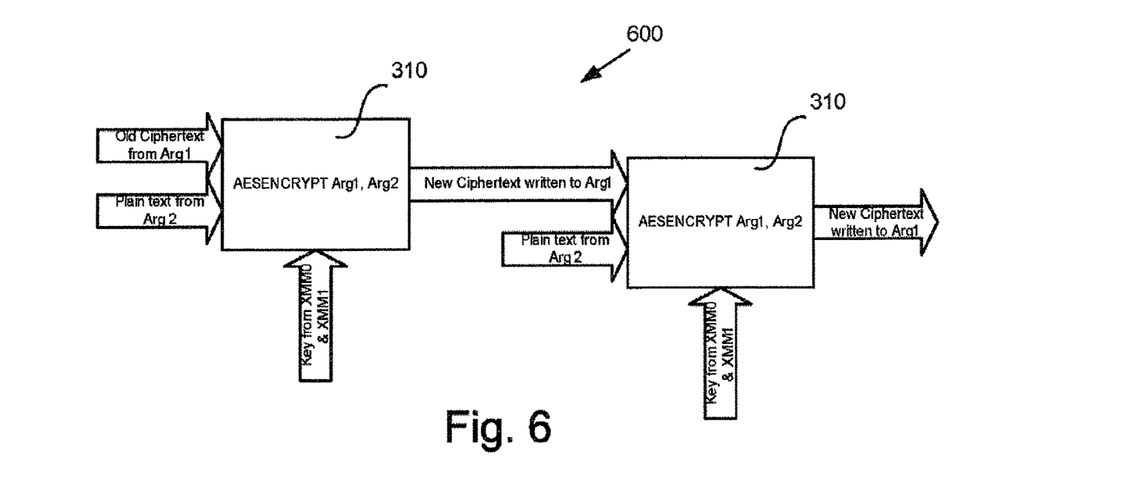
FIG. 6 conceptually illustrates two chained AES encryption instructions used in CBC mode.

FIG. 6 conceptually illustrates two chained AES encryption instructions 600 used in CBC mode. This visually shows the temporal nature of CBC mode (the first-in-time operation appearing on the left of the figure), where the result of the previous encryption block is XORed with the new plaintext. This produces a more random ciphertext than ECB mode (e.g., in ECB mode the same plaintext block will encrypt into the same ciphertext block given the same key). In CBC mode as shown in FIG. 6, the ciphertext for a given block of plaintext depends upon the ciphertext result of the previous round.

Figure 7:
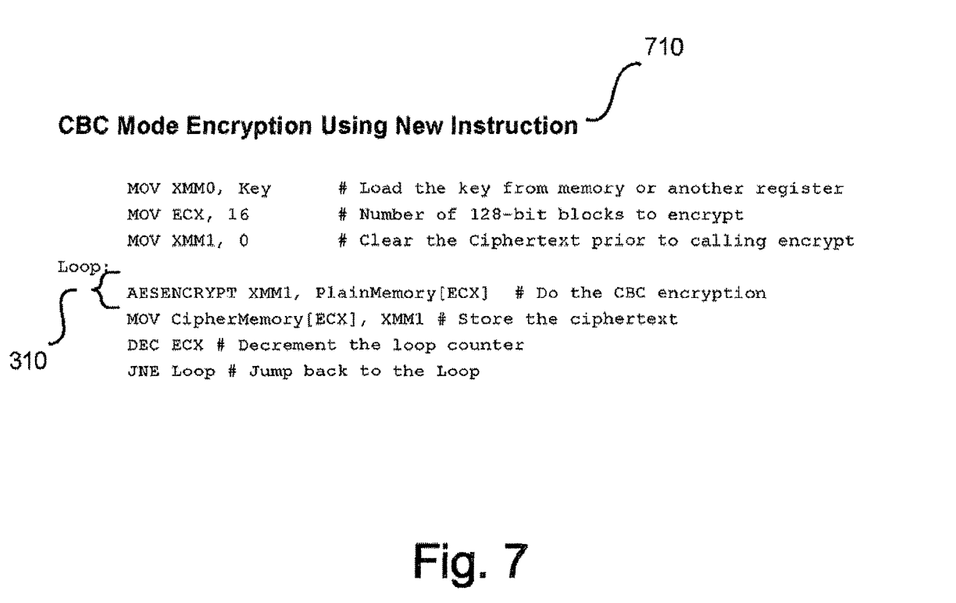
FIG. 7 illustrates example code for using the AES encryption instruction in CBC mode.

FIG. 7 illustrates example code (e.g., which when executed by processor 190 constitutes a method) 710 for using the AES encryption instruction in CBC mode. First the encryption key is loaded (via MOV instruction or similar) into one of the implicit registers XMM0. Next a value (e.g., 16, but this number may be higher or lower) may be loaded (via MOV instruction or similar) into another register ECX to set the number of 128-bit blocks of plaintext to AES encrypt. This value multiplied by 128 bits may specify the total length of the plaintext to be encrypted by code 710. Also, for the first time through the loop, XMM1 may be cleared by loading a zero, because there is no ciphertext from a prior block with which to combine with the first block of plaintext. After such initialization, a loop including AESENCRYPT 310 may be executed ECX times.

Within the loop, AESENCRYPT 310 takes the plaintext in Plainmemory[ECX], XORs it with the value in XMM1 (e.g., zero for the first time through the loop), encrypts the XORed result with the key in XMM0, and writes the result into the second implicit register XMM1 over the value that was already there. Next the ciphertext in XMM1 is stored to Ciphermemory[ECX] and the loop value in ECX is decremented before jumping back to the beginning of the loop.

At the next loop, and differently from ECB mode, the non-zero ciphertext result for the previous 128 bits in XMM1 is not cleared. Rather, it is XORed with the next block of plaintext by AESENCRYPT 310 prior to encryption with the key according to CBC mode. In this manner, AESENCRYPT 310 has the double inputs of Plainmemory[ECX] for the decremented value in ECX and the ciphertext value in XMM1 from the previous loop. The AESENCRYPT 310 instruction XORs the two inputs and encrypts the result with the key in XMM0. The looping execution of code 410 may continue until all blocks of plaintext specified by the initial value loaded into ECX have been AES encrypted in CBC mode.

The above-described scheme and system may advantageously perform CBC mode and ECB mode encryption using a single, two operand instruction. This instruction allows tighter loops for AES in its most common two modes. The instruction works with a limited number of operands, and moves the most common usage of AES into a single instruction which still supports the second most frequent usage.

Figure 8:
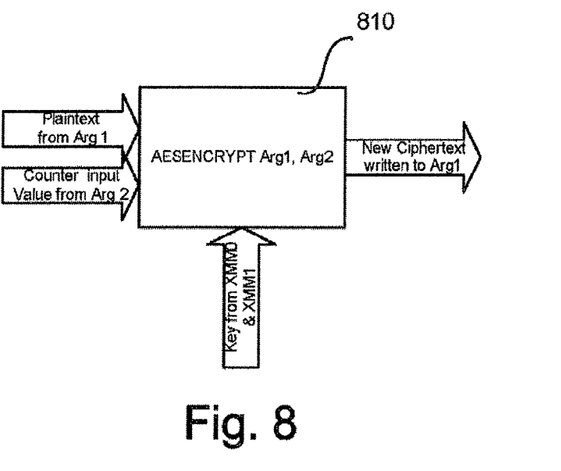
FIG. 8 conceptually illustrates an AES encryption instruction used in CTR mode.

FIG. 8 conceptually illustrates an AES encryption instruction (AESENCRYPT Arg1, Arg2) 810 used in CTR mode. As shown, AESENCRYPT 810 has two operands, one of which, Arg2, supplies the counter value to be encrypted. In CTR mode, the other operand, Arg1, provides the plaintext to be encrypted, which is XORed with the plaintext by AESENCRYPT 810 after encryption. The encryption key is supplied from one or more of the implicit 128-bit registers XMM0 and XMM1. The encrypted ciphertext for the current block is overwritten on Arg1 of AESENCRYPT 810.

Figure 9:
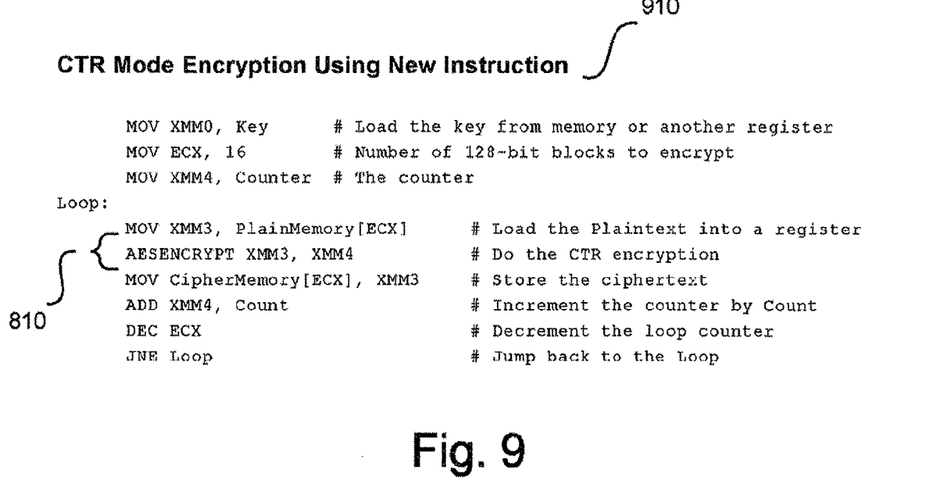
FIG. 9 illustrates example code for using the AES encryption instruction in CTR mode.

FIG. 9 illustrates example code (e.g., which when executed by processor 190 constitutes a method) 910 for using the AES encryption instruction in CTR mode. First the encryption key is loaded (via MOV instruction or similar) into one of the implicit registers XMM0. Next a value (e.g., 16, but this number may be higher or lower) may be loaded (via MOV instruction or similar) into another register ECX to set the number of 128-bit blocks of plaintext to AES encrypt. This value multiplied by 128 bits may specify the total length of the plaintext to be encrypted by code 910. Next a Counter value is loaded (via MOV instruction or similar) into another XMM register (such as XMM4). After such initialization, a loop including AESENCRPT 810 may be executed ECX times.

Within the loop, AESENCRYPT 810 takes the counter value will actually encrypt the counter value and then perform the XOR with the plaintext data to produce the ciphertext. Next the ciphertext in XMM3 is stored to Ciphermemory [ECX] and the loop value in ECX is decremented before jumping back to the beginning of the loop. Afterwards, the counter is adjusted as appropriate (via an ADD, MUL or other instruction). The loop otherwise proceeds identically to ECB mode.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although AES encryption and decryption have been described for a 128-bit key, the NIST standard in FIPS Publication 197 permits 192-bit and 256-bit keys. In such a case, XMM1 may be used for the other 64 bits or 128 bits in the 192-bit or 256-bit key. In such a case, some other 128 bit register (e.g., XMM2, XMM3, etc.) may be used instead of XMM1 in code 410 or code 710 or code 910 (or whatever code in which AESENCRYPT or AESDECRYPT resides), because a portion of the key is resident in XMM1.

Although AESENCRYPT has been described above, AES-DECRYPT Arg1, Arg2 may be used in a similar manner to support AES decryption in ECB mode, CTR mode and in CBC mode. Those skilled in the art will recognize that use of AESDECRYPT in ECB mode is relatively straightforward, while CBC mode may entail additional computation, such as the inverse or opposite of the XOR operation performed by AESENCRYPT during encryption.

It should also be recognized that although the details of exactly how AESENCRYPT and AESDECRYPT perform the AES algorithm has not been presented, such is well within the capability of those skilled in the encryption arts. The particular implementation may tend to be optimized for the particular processor 190 on which AESENCRYPT and AES-DECRYPT are executed. In some implementations, these instructions may be optimized in machine language for the most rapid execution possible. The details of such optimization are not particularly germane to the claimed invention, and have been omitted for clarity of explanation.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A processor comprising:
a hardware decoder to decode instructions;
a register file comprising a plurality of registers to store a plurality of blocks of data; and
a hardware execution unit to execute decoded instructions decoded by the hardware decoder, the hardware execution unit including a crypto circuit to execute an Advanced Encryption Standard (AES) instruction that has at least two operands including a first operand and a second operand, the crypto circuit to encrypt the plurality of blocks of data according to a particular AES encryption mode, determine, during execution of the AES instruction, the particular AES encryption mode based at least in part on a value of the first operand, including to encrypt the second operand with a key stored in at least a first register of the register file prior to the AES instruction decoded by the hardware decoder and subsequently executed by the hardware execution unit, the at least first register an implicit register not specified by the AES instruction and included in the register file, wherein the crypto circuit is to execute the AES instruction according to the particular AES mode of Electronic Codebook (ECB) when the first operand value is zero for a plurality of iterations of a loop of hardware execution unit execution of the AES instruction as decoded by the hardware decoder for an AES instruction operation, and to execute the AES instruction according to the particular AES mode of Cipher Block Chaining (CBC) when the first operand value is an encrypted block of a prior iteration of the plurality of iterations of the loop of decoded AES instruction execution, wherein a number of the plurality of iterations of the loop of decoded AES instruction execution corresponds to a number of the plurality of blocks of data according to the particular AES encryption mode.

2. The processor of claim 1, wherein a first block and a corresponding encrypted result are 128 bits in length.

3. The processor of claim 1, wherein the processor further comprises an internal interconnect to couple the register file and the hardware execution unit.

4. The processor of claim 1, wherein the processor further comprises at least one cache memory.

5. The processor of claim 1, wherein the implicit register comprises an extension register.

6. The processor of claim 5, wherein the extension register comprises 128 bits.

7. The processor of claim 1, wherein the at least first register comprises a plurality of registers.

8. processor of claim 1, wherein when the AES encryption mode is Electronic Codebook (ECB), the crypto circuit is to encrypt a selected block of data of the plurality of blocks of data by application of an exclusive OR operation to the first operand having a value of zero and the second operand that comprises the selected block of data to produce a combined result, and encrypt the combined result with a key to produce a corresponding encrypted data block.

9. The processor of claim 1, wherein when the particular AES encryption mode is CBC, in a first iteration the crypto circuit is to encrypt a first block of data of the plurality of blocks of data by application of an exclusive OR operation to the first operand having an initial value of zero and the second operand that comprises the first block of data to produce a first combined result, and encrypt the combined result with a key to produce a first encrypted data block, and in a second iteration encrypt a second block of data of the plurality of blocks of data by application of the exclusive OR operation to the first operand comprising the first encrypted data block, and the second operand that comprises the second block of data to produce a second combined result, and encrypt the second combined result with a key to produce a second encrypted data block.

10. The processor of claim 1, wherein when the first operand is a counter value the particular AES mode is determined to be Counter (CTR), the crypto circuit is to encrypt the first operand to form an encrypted first operand and apply an exclusive OR operation to the encrypted first operand and the second operand that comprises the first block to produce a first block CTR-encrypted result.

11. The processor of claim 10, wherein after the first block CTR-encrypted result is produced, the crypto circuit is to encrypt a second block of data of the plurality of blocks of data including adjustment of the counter value to an adjusted counter value, select the first operand to be the adjusted counter value and encrypt the first operand, select the second operand to be the second block of data, and apply the exclusive OR operation to the first operand and the second operand to produce a second CTR-encrypted result.

12. The processor of claim 11, wherein after the second block CTR-encrypted result is produced, the crypto circuit is to encrypt a successive block of data of the plurality of blocks of data including readjustment of the adjusted counter value to a readjusted counter value, select the first operand to be the readjusted counter value and encrypt the first operand, select the second operand to be the successive block of data, and apply the exclusive OR operation to the first operand and the second operand to form a successive CTR-encrypted result.

13. A machine-readable non-transitory medium having stored thereon an instruction, which if executed by a machine, causes the machine to perform a method comprising:

receiving an Advanced Encryption Standard (AES) instruction;

decoding, by a hardware decoder, the AES instruction;

determining an AES mode by which to encrypt a plurality of blocks of data based at least in part on a value of a first operand of the AES instruction; and performing, via a crypto circuit of a hardware execution unit of a processor, encryption of the blocks of data including, for each iteration of a plurality of iterations of a loop of hardware execution unit execution of the AES instruction as decoded by the hardware decoder for an AES instruction operation, encrypting the second operand with a key stored in at least a first register of a register file of the processor prior to the AES instruction decoded by the hardware decoder and subsequently executed by the hardware execution unit, the at least first register an implicit register not specified by the AES instruction and included in the register file, according to the particular AES mode of Electronic Codebook (ECB) when the first operand value is zero for a plurality of iterations of a loop of decoded AES instruction execution operation, and according to the particular AES mode of Cipher Block Chaining (CBC) when the first operand value is an encrypted block of a prior iteration of the plurality of iterations of the loop of decoded AES instruction execution, wherein a number of the plurality of iterations of the loop of decoded AES instruction execution corresponds to a number of the plurality of blocks of data according to the particular AES encryption mode.

14. The machine-readable non-transitory medium of claim 13, wherein the AES mode is determined to be Electronic Codebook (ECB) responsive to the first operand having a value of zero.

15. The machine-readable non-transitory medium of claim 14, wherein the AES mode is determined to be Cipher Block Chaining (CBC) responsive to the first operand value having an encoded result.

16. The machine-readable non-transitory medium of claim 15, wherein the method further comprises, when the AES mode is determined to be CBC: initially selecting the first operand to have a value of zero and a second operand of the AES instruction to be a first block of data of the plurality of blocks of data, applying an exclusive OR operation to the first operand and the second operand to form a first block unencrypted result, and encrypting the first block unencrypted result using the key to produce a first block CBC-encrypted result; and after the first block CBC-encrypted result is produced, selecting the first operand to be the first block CBC-encrypted result, selecting the second operand to be a second block of data of the plurality of blocks of data, applying the exclusive OR operation to the first operand and the second operand to form a second block unencrypted result, and encrypting the second block unencrypted result using the key to produce a second block CBC-encrypted result.

17. The machine-readable non-transitory medium of claim 14, wherein when the AES mode is determined to be ECB, the method further comprises:

applying an exclusive OR operation to the first operand and a second operand of the AES instruction to form an unencrypted block result, wherein for each iteration of the plurality of iterations the first operand has a first operand value of zero and the second operand comprises a corresponding block; and encrypting the unencrypted block result via the key to produce an ECB-encrypted block result.

18. The machine-readable non-transitory medium of claim 13, wherein the method further comprises: determining that the AES mode is to be Counter (CTR) responsive to the first operand being a counter value, and encrypting the first operand to form an encrypted first operand; selecting a first block of data of the plurality of blocks of data to be a second operand of the AES instruction and applying the exclusive OR operation to the encrypted first operand and the second operand to produce a first block CTR-encrypted result; and adjusting the counter value to an adjusted counter value, selecting the first operand be the adjusted counter value and encrypting the first operand, selecting the second operand to be a second block of data of the plurality of blocks of data, and applying the exclusive OR operation to the first operand and the second operand to produce a second CTR-encrypted result.

19. A system comprising:
a memory to store an Advanced Encryption Standard (AES) encryption instruction that has at least two AES data encryption modes; and
a processor comprising:
a hardware decoder to decode instructions;
a register file comprising a plurality of registers to store a plurality of blocks of data; and
a hardware execution unit to execute decoded instructions decoded by the hardware decoder, the hardware execution unit including a crypto circuit to execute an Advanced Encryption Standard (AES) instruction that has at least two operands including a first operand and a second operand, the crypto circuit to encrypt the plurality of blocks of data according to a particular AES encryption mode, determine, during execution of the AES instruction, the particular AES encryption mode based at least in part on a value of the first operand, including to encrypt the second operand with a key stored in at least a first register of the register file prior to the AES instruction decoded by the hardware decoder and subsequently executed by the hardware execution unit, the at least first register an implicit register not specified by the AES instruction and included in the register file, wherein the crypto circuit is to execute the AES instruction according to the particular AES mode of Electronic Codebook (ECB) when the first operand value is zero for a plurality of iterations of a loop of hardware execution unit execution of the AES instruction as decoded by the hardware decoder for an AES instruction operation, and to execute the AES instruction according to the particular AES mode of Cipher Block Chaining (CBC) when the first operand value is an encrypted block of a prior iteration of the plurality of iterations of the loop of decoded AES instruction execution, wherein a number of the plurality of iterations of the loop of decoded AES instruction execution corresponds to a number of the plurality of blocks of data according to the particular AES encryption mode.

20. The system of claim 19, wherein the processor further comprises at least one cache memory.

21. The system of claim 19, wherein the implicit register comprises an extension register comprising 128 bits.

* * * * *